United States Patent [19]
Aoki et al.

[11] Patent Number: 5,204,666
[45] Date of Patent: Apr. 20, 1993

[54] INDICATION DISPLAY UNIT FOR VEHICLES

[75] Inventors: Kunimitsu Aoki; Tadashi Iino, both of Susono, Japan

[73] Assignee: Yazaki Corporation, Tokyo, Japan

[21] Appl. No.: 752,935

[22] Filed: Aug. 30, 1991

Related U.S. Application Data

[63] Continuation of Ser. No. 262,377, Oct. 25, 1988, abandoned.

[30] Foreign Application Priority Data

Oct. 26, 1987 [JP] Japan ............... 62-162514[U]
Nov. 24, 1987 [JP] Japan ............... 62-177479[U]

[51] Int. Cl.⁵ ............................................. G09G 3/02
[52] U.S. Cl. .................................. 340/705; 340/980; 359/13
[58] Field of Search ............ 340/705, 980; 359/13, 359/14; 358/103, 104, 250, 93; 350/174

[56] References Cited

U.S. PATENT DOCUMENTS

| | | | |
|---|---|---|---|
| 4,635,033 | 1/1987 | Inukai et al. | 340/705 |
| 4,775,218 | 10/1988 | Wood et al. | 350/174 |
| 4,831,366 | 5/1989 | Iino | 340/705 |
| 4,837,551 | 1/1989 | Iino | 340/705 |
| 4,876,594 | 10/1989 | Schiffman | 340/705 |
| 4,886,328 | 12/1989 | Iino | 350/174 |
| 4,908,611 | 3/1990 | Iino | 353/14 |

FOREIGN PATENT DOCUMENTS

| | | | |
|---|---|---|---|
| 3120601 | 12/1982 | Fed. Rep. of Germany | 340/705 |
| 0137236 | 6/1987 | Japan | 340/705 |

Primary Examiner—Ulysses Weldon
Assistant Examiner—M. Fatahi Yar
Attorney, Agent, or Firm—Armstrong, Westerman, Hattori, McLeland & Naughton

[57] ABSTRACT

An indication display unit for vehicles of this invention is provided with a head-up display (HUD), an indication projector, a display device located at the ceiling of the vehicle, and a reflector forwardly located relative to a driver's seat. The indication display unit of this invention further includes a shifting mechanism for the reflector so that when the vehicle speed decreases lower than a predetermined low speed limit, the reflector can be completely shifted away from the driver's visual field. The shifting of the reflector can be accomplished by having the reflector shift in a vertical direction or just outside, but near the driver's visual field, in a horizontal direction.

9 Claims, 7 Drawing Sheets

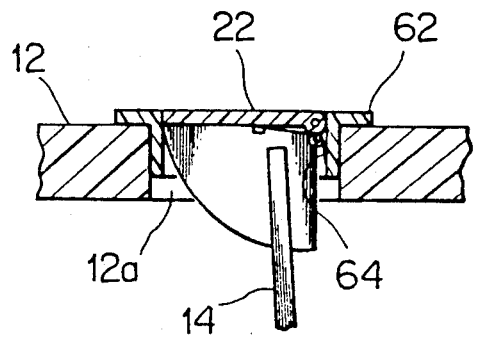
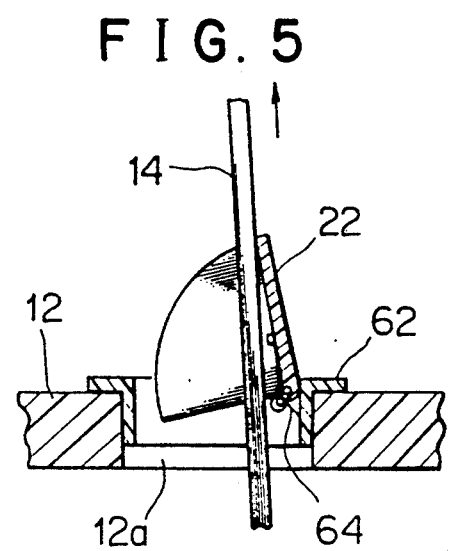
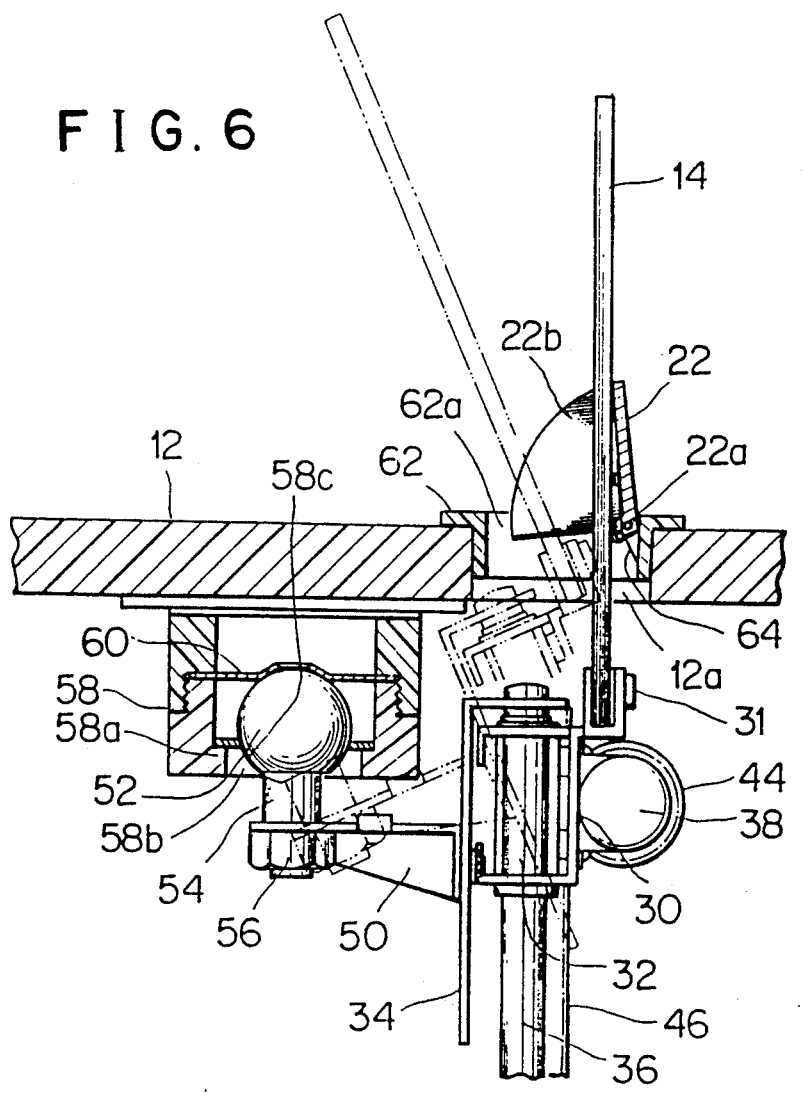

INDICATION DISPLAY UNIT FOR VEHICLES

This application is a continuation of application Ser. No. 262,377 filed Oct. 25, 1988, now abandoned.

BACKGROUND OF THE INVENTION

1. Field of the Invention

The present invention relates to an indication display unit for vehicles which provides a driver with the whole information concerning its navigation such as its velocity, revolution frequency of the engine, left-fuel quantity, clock, and other various alarm devices in use of an indication projector for projecting image to the surface of a reflecting means which is located in front of a driver seat.

2. Description of the Prior Art

Conventionally, widely used indication display unit for vehicles comprise a semi-translucent mirror as a reflecting means located on the top surface a dashboard in front of a windshield, so that above mentioned various indications are projected thereto so as to enable a driver to sight a virtual image therebehind ahead of the windshield.

The indication display unit of this type is called a head-up display (hereinafter referred to as "HUD"), and is used for saving space for installation of increasing number of display devices or for raising the safety level by providing the driver with various driving information during the vehicle is moving at high speed.

However, since the above semi-translucent mirror is fixedly upright on the dashboard according to the conventional device, not only it is effective only when a vehicle is moving at low speed in which case the driver can sight the speed meter located in the normal instrument panel position, but it can also be a great nuisance as it is fixed just in front of the driver.

For example, FIG. 15 shows two indicating states in a conventional device. FIGS. 15a and 15b show the cases when the vehicle speed is 188 Km/h, and when it is 5 Km/h respectively.

The visual field of the driver varies according to the vehicle's moving speed. For example, as shown in dashed lines in FIG. 15, the visible range A' when its moving speed is low (shown in FIG. 15b) becomes wider than the other range A realized when it is high (shown in FIG. 15a). Therefore, the driver is not disturbed by the reflecting means 14 when the vehicle is moving at high speed since the displayed image B reflected thereon is sighted outside but near the range A, but when at low speed, the driver feels annoyed at the existence of the reflecting means 14 since the displayed image B' is located within the visible range A', and consequently the only thing the driver can is to put up with it.

There is also another problem that conventional type reflecting means easily gets dirt because it is fixedly located on the dashboard, whereby so as to acquire the clear image it should be cleaned all the time.

Thus the principal object of the present invention is to provide an indication display unit for vehicles equipped with a reflecting means shifting means, whereby it can be put away outside the driver's visual field while the image projected from an indication projector is not required.

SUMMARY OF THE INVENTION

In order to solve the aforementioned existing problems, the present invention suggests an indication display unit for vehicles equipped with two reflecting means shifting mechanisms; one of which can shift it vertically, and the other can shift it transversely, so that the driver can have wider visual field compared with the conventional one while the vehicle is moving at low speed.

For example by providing a reflecting means vertical shifting mechanism, the reflecting means is shifted from the state in which it is on a dashboard forwardly of the driver to that in which it is stored therein through an opening disposed thereon in the case that the vehicle moving speed is lowered to the predetermined velocity.

On the other hand, by providing a reflecting means horizontal shifting mechanism, the reflecting means is shifted to the area forwardly of the driver when the vehicle is running faster than the predetermined low speed limit, and is shifted transversely to a far side area of the driver which is outside but near the driver's visual field when the vehicle speed is lowered than the predetermined low speed limit.

In this case above, the reflecting means to be shifted transversely on the dashboard according to the velocity of the vehicle is always moved just outside the visible range of the driver, which also changes according to the velocity of the vehicle, so as to display the reflected image thereon near the driver's visual field.

BRIEF DESCRIPTION OF THE DRAWINGS

FIGS. 4 and 5 are sectional views corresponding to FIGS. 2 and 3 respectively;

FIGS. 6 and 7 are respectively a side view and a rear view of a part of the display unit shown in FIG. 1 in the different moving states;

DETAILED DESCRIPTION OF THE EMBODIMENT

The above and other objects and features of the present invention will become apparent upon reading the following detailed description of the three embodiments with reference to the accompanying FIG. 1 to FIG. 15. In the following explanations, the same composing members are numbered with the same numerals so as not to repeat the explanation.

THE FIRST EMBODIMENT

Figure 1:
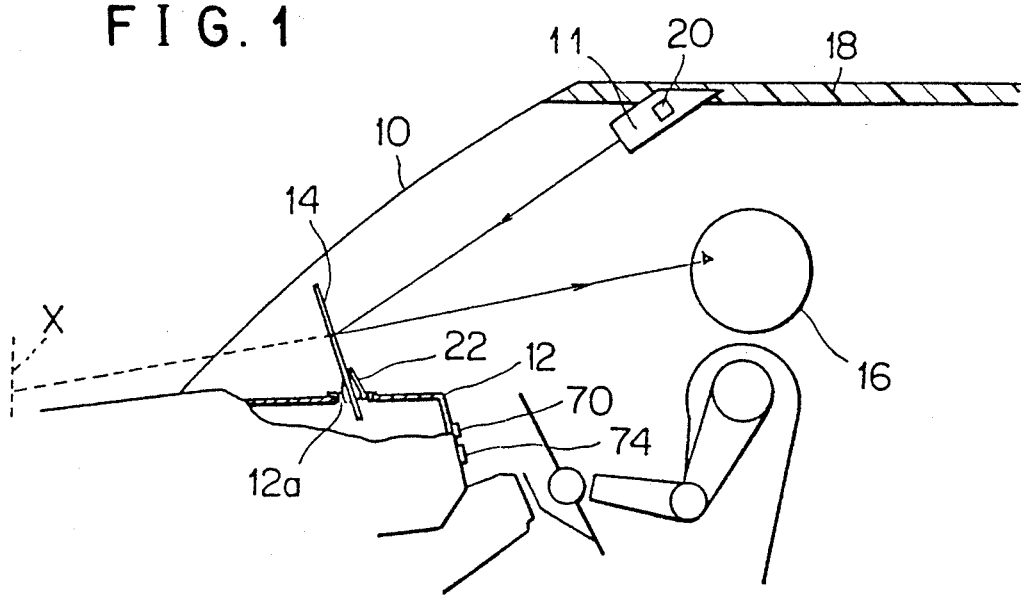
FIG. 1 is a perspective view showing the first embodiment of the indication display unit for vehicles according to the present invention.

FIG. 1 shows an example of the indication display unit applied according to the present invention.

In the figure, disposed on a dashboard 12 in front of a windshield 10 is a transmissive type reflecting means 14 located upright composed of a semi-translucent mirror, hologram board and so on. On the reflecting surface of the reflecting means opposing to the driver 16, an indicating image is projected from a display device 20 mounted at the ceiling 18 of the vehicle. The projected image is formated forwardly of the windshield 10 as an upright virtual image, and the driver can sight it thereahead as a superposed image with the outside scenery.

Figure 2:
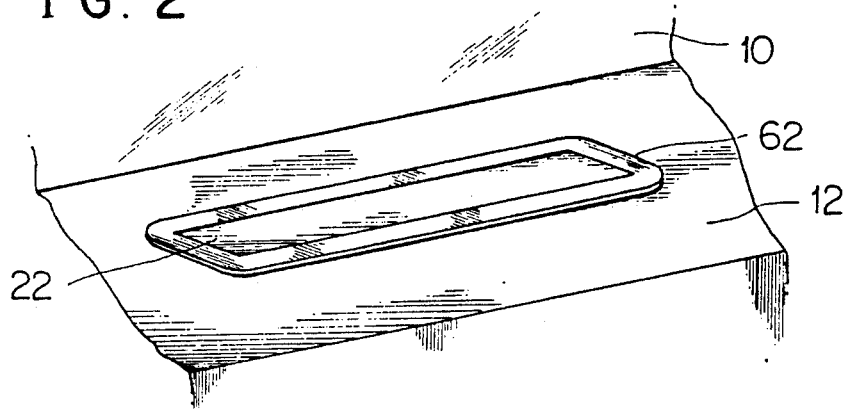
FIGS. 2 and 3 are external views showing different states of the reflecting means respectively.
Figure 3:
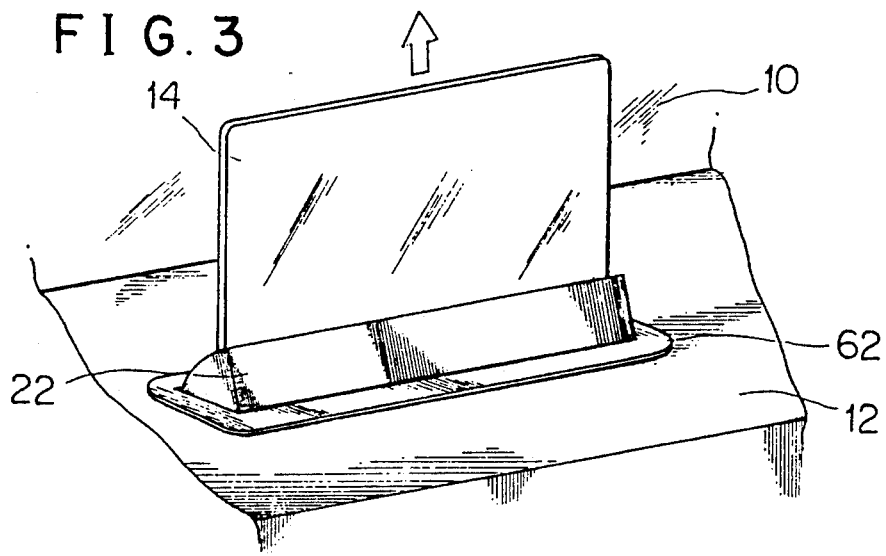

The reflecting means 14 protrudes upright by pushing a lid 22 from inside the dashboard 12 as shown in FIGS. 3 and 5 through an opening 12a of the dashboard 12 which is normally shut by the lid 22 as shown in FIGS. 2 and 4. The detailed mechanism for the operation is as follows;

The lower end of the reflecting means 14 is fastened to a fixing metal 30 through a fastening screw 31 inserted therebetween, and a pair of pipes 32 are fixed to the fixing metal 30, each of which is slidably engaged with a pair of guide rails 36 arranged to a base plate 34 in parallel.

Also to the fixing metal 30, a motor 38 is fixedly attached, and to a shaft 40, one end of which is fixed by a screw 39 to the rotational axis of the motor 38, a pinion gear 44 is disposed through a friction transmitting mechanism 42. The friction transmitting mechanism 42 is composed by inserting a pinion gear 44, a coil spring 42c, a washer 42d one by one to the above shaft 40, to one end of which a washer 42b is containing a friction member 42a is fixedly attached, and setting two nuts 42e afterwards to the screw portion 40a situated at the other end thereof, whereby the edge surface of the pinion gear 44 is pressed to the friction member 42a with affect of the elasticity of the coil spring 42c. Aforementioned pinion gear 44 is engaged with a track 46 disposed between the both guide rails 36.

On the rear surface of the base plate 34 a supporting rack 50 is fixedly attached, whose opposite end is also fixed by a nut 56 to a bolt 54, on the other end of which a spherical body 52 is fixedly attached. The spherical body 52 of the bolt 54 is stored in the mounting case 58 which is fixed to the inner wall of the dashbord 12, and is protruding to the outside of the case 58 through an elongate opening 58b perforated by the bolt 54 on the bottom surface 58a of the case 58. On the inner surface of the bottom surface 58a of the case 58 a concave surface 58c is formed, which is to be covered by the surface of the spherical body 52, and the surface of the spherical body 52 is elastically contacted with the concave surface 58c by the pressing function of an elastic board 60, so that the rotational location of the bolt 54 rotating about the spherical body 52 along the longer side of the elongate opening 58b is maintained.

The opening 12a of the dashboard 12 is engaged with a wrapping cover 62 for covering the edge portion of the upper surface thereof, and a lid 22 is rotatably mounted thereon.

The hinged rotational support 22a of the lid 22 is located on the both sides of the open inlet 62a of the wrapping cover 62 near the driver seat, so that the lid 22 pushed up by the reflecting means 14 stands upright at the reflecting surface side of the above reflecting means 14. The lid 22 is formed to be usually closed by a spring coil 64, and it closes when the reflecting board 14 lowers down itself into the dashboard. Therefore, if a member to clean the surface of the reflecting board 14 is attached on the rear surface of the lid 22, the board 14 is cleaned whenever it is raised or lowered down.

Besides, a fan-shaped blinding board 22b the diameter of which increases or decreases is disposed at the both sides of the lid 22, whereby the open inlet 62a cannot be seen from the forward stint direction in the state that the lid is open.

Figure 7:
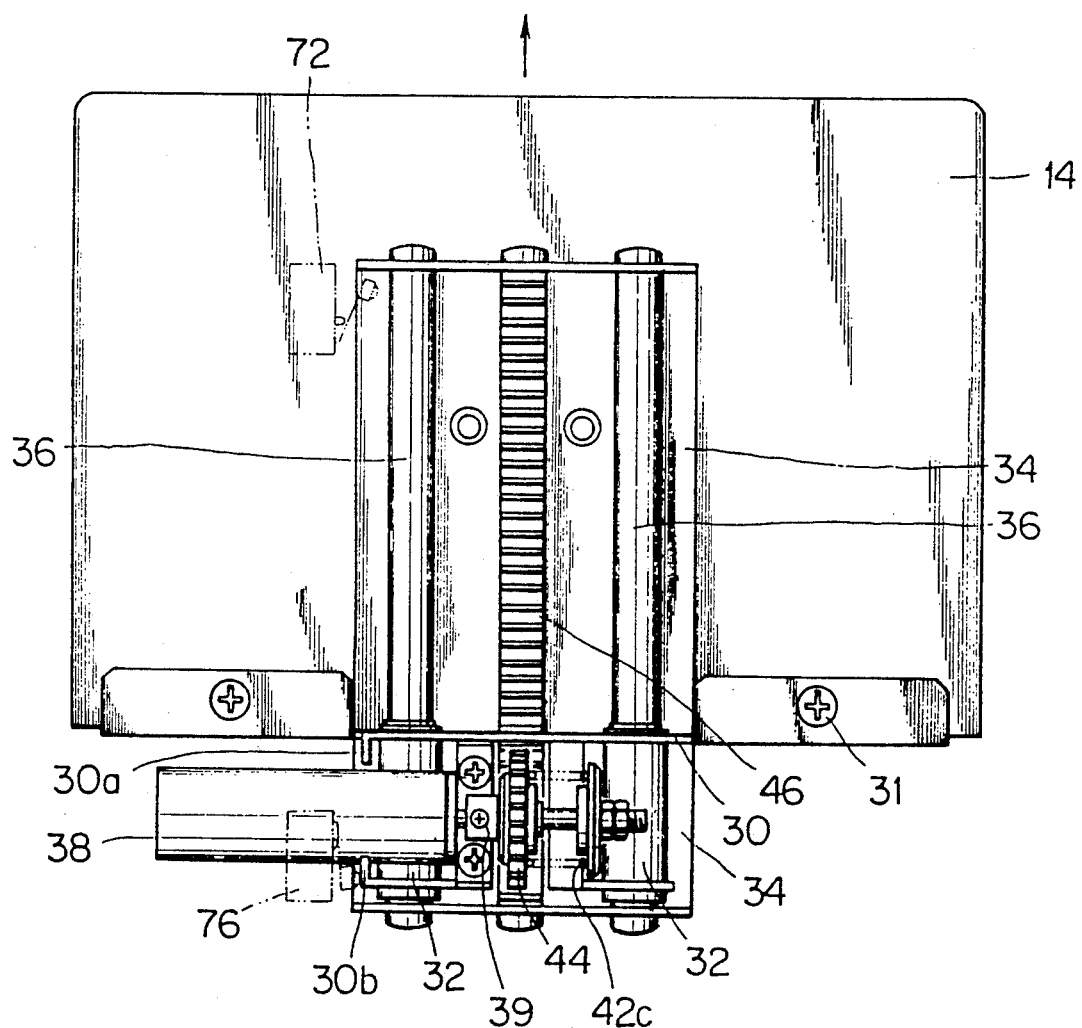

In this above configuration, in the state that the reflecting board 14 is stored in the dashboard 12, and that the lid 22 is closed as shown in FIG. 2, when the upraising button 70 is pressed, one way current is energized to a motor 38 through a switch (not shown) and the motor is activated to rotate to the indicated direction, and by this, the pinion gear 44 is also activated to rotate on the rack 46, and the reflecting means 14 supported by the fixing metal 30 and the metal itself are shifted to the direction as shown in FIG. 7 so as to push up the lid 22 to be as of the situation as shown in FIGS. 3 and 6.

When the reflecting board 14 is raised to be in the state as shown in FIGS. 3 and 6 the fixing metal 30 is raised upto the base plate 34, so that it cannot move any further, and at the same time a limit switch 72 is switched on by a part 30a thereof, whereby the energy supply to the motor 38 is stopped.

Figure 8:
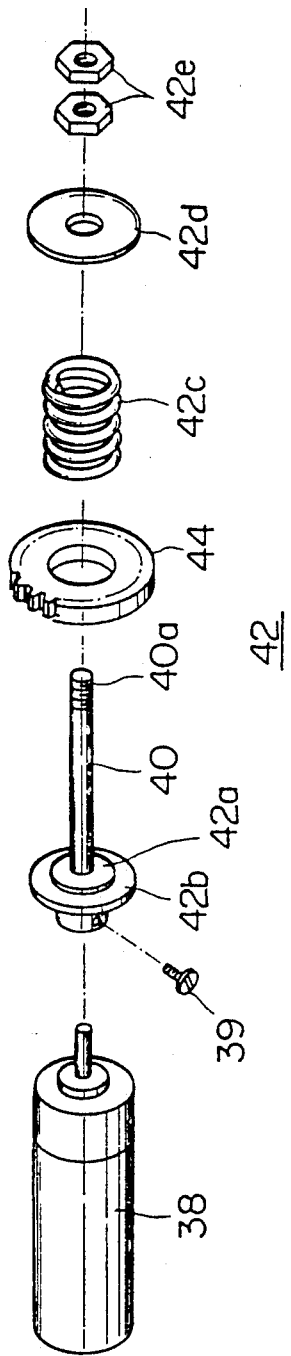
FIG. 8 is an exploded view of a part of FIGS. 6 and 7.

In this situation, the rotation of the motor 38 is absorbed by the friction transmitting mechanism 42 as shown in FIG. 8 until it completely stops, accordingly there will be no overloading to the motor 38.

In the state shown in FIGS. 3 and 8 the angle of the reflecting means 14 towards the driver can be adjusted by pushing the upper end thereof towards the windshield 10 or by drawing it toward the driver seat, for the base plate 34 and the reflecting means 14 are rotated around the spherical body 52 thereby. Therefore, the driver can rotate the reflecting means 14 according to his driving style or his body condition, so that the reflecting board can be faced to him at the optimum angle.

On the other hand, by pressing the downgoing button 74 mounted on the dashboard 12 the current supply to the motor 38 flows in the opposite direction, so that the fixing metal 30 and the reflecting board 14 are lowered down so as to be in the state as shown in FIGS. 2, 4, and 7. In this state, the limit switch 76 is switched on by a part 30b of the fixing metal 30 and the current supply to the motor 38 is stopped.

By the way, although in the embodiment shown above the up/down operation of the reflecting means 14 is performed by the above operation buttons, it can be set in such a way that it is automatically switched according to the speed of the vehicle, that is, to raise the reflecting means when the vehicle speed is faster than the predetermined low speed limit, and also to lower down the reflecting means when it is below the above low speed limit.

In this case, it is preferable to provide a hysterisis between 10 and 20 Km/h for raising or lowering the speed of the vehicle.

THE SECOND EMBODIMENT

Figure 9:
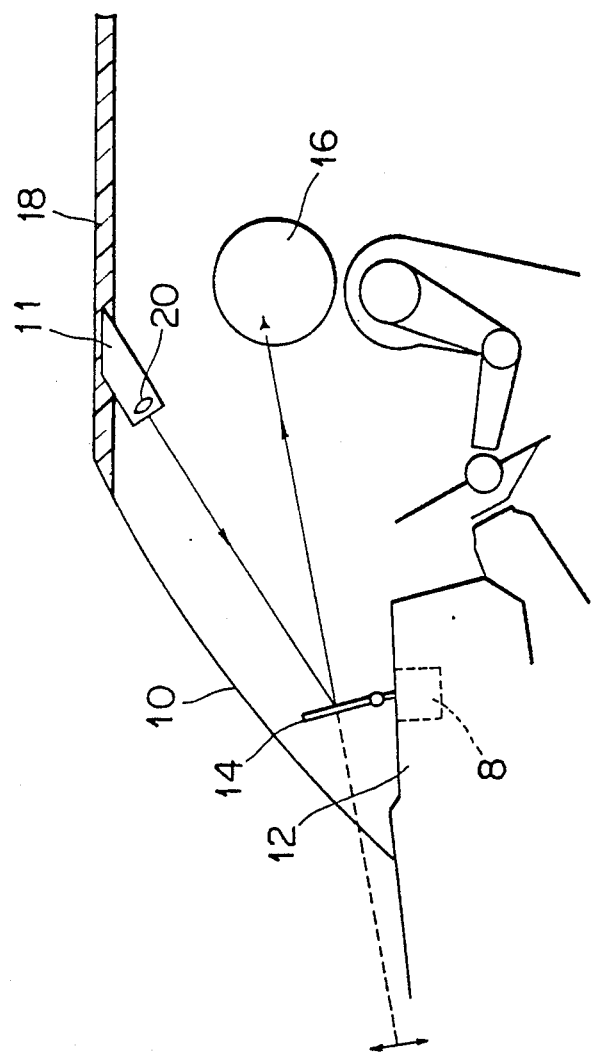
FIG. 9 is a perspective view showing the second embodiment of the indication display unit for vehicles according to the present invention.

FIG. 9 shows the second embodiment according to the present invention.

As shown in the figure, the projector 11 that stores the display device 20 is fixed at the ceiling 18 above the driver seat, and on the dashboard 12 in front of the windshield 10 the reflecting means 14 is disposed.

This reflecting means 14 is made of a transparent member, which reflects the image projected from the above display device 20 to the driver, and at the same time absorbs the light from the windshield 10, so that the above displayed image can be seen ahead of the windshield as if they are superposed in the outside scenery.

Figure 11:
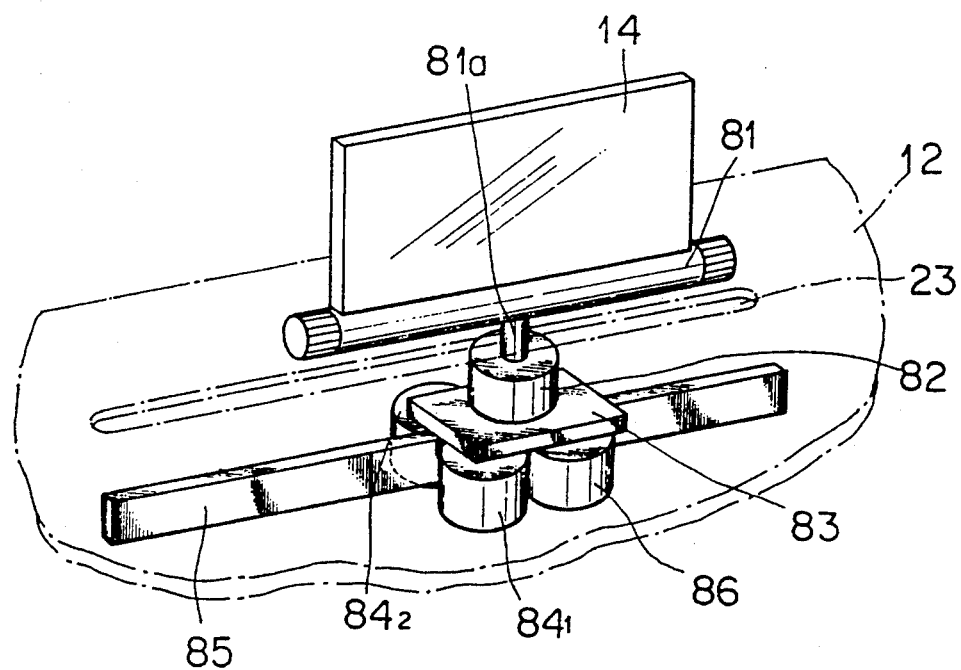
FIG. 11 shows the reflecting means shifting means in the second embodiment.

Inside the dashboard 12, a reflecting means shifting means 8 is located for supporting the reflecting board 14 and for shifting it transversely along the slit running in approximate parallel with the windshield 10. FIG. 11 shows the above mentioned reflecting means shifting means 8. In the figure, 81 denotes a supporting member for supporting the reflecting means 14 at its vertical axis 81a, 82 an angle controlling motor for activating the above reflecting means 14 and the supporting member 81 thereof to rotate about the vertical axis 81a, and at the lower end of which the motor axis of the above angle controlling motor 82 is disposed.

83 denotes a fixing plate on the upper surface of which the above angle controlling motor 82 is fixed, 841, 842 denote a pair of rollers arranged at the lower surface of the above fixing plate 83, and 85 denotes a guide rail fixed inside the dashboard 12 with its longer side being in parallel with the windshield 10. The above guide rail is interposed between the above pair of rollers 841 and 842, so that the fixing plate 83 is slidably supported along the loger side of the guide rail thereof.

86 denotes a location shifting motor mounted at the lower surface of the above fixing plate 83, the rotating force of which is transmitted to the above roller 841 through a gear (not shown).

When the location shifting motor 86 is activated, the reflecting means 14, supporting member 81, the angle controlling motor 82, the fixing plate 83, a pair of rollers 841 and 842, and the location shifting motor 86 itself are shifted along the the guide rail 85.

By the way, on the upper surface of the dashboard 12, an elongate slit 23 is formed in parallel with the guide rail 85 therebetween, whereby the vertical shaft 81a of the above supporting member 81 is inserted into the elongate slit 23 and the angle controlling motor 82 inside the dashboard 12 is connected to the reflecting means 14 and the supporting member 81 thereof outside the dashboard 12 through the shaft 81a.

Furthermore, the above angle controlling motor 82 and the location shifting motor 86 are activated when the preset vehicle speed is changed between the predetermined low speed and the high speed ranges.

Figure 12:
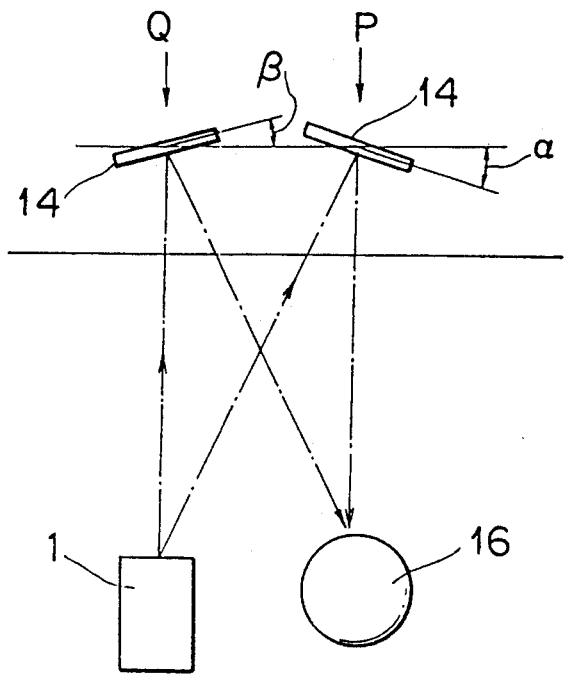
FIG. 12 is a schematic view showing a shifting location and rotating angle of the reflecting means.

FIG. 12 shows the location of the reflecting means which is changed according to the range of the predetermined speed, and FIG. 10 shows the indicating state in each of high speed and low speed ranges respectively.

When the vehicle speed gets into the high speed range, the reflecting means 14 is moved to be located at the right front point P of the driver 16, and at the same time the angle of the surface thereof is rotatively shifted for α degree to the shifted direction, so that the displayed image projected from the projector 11 is reflected to the location of the driver's eyes.

Figure 10A:
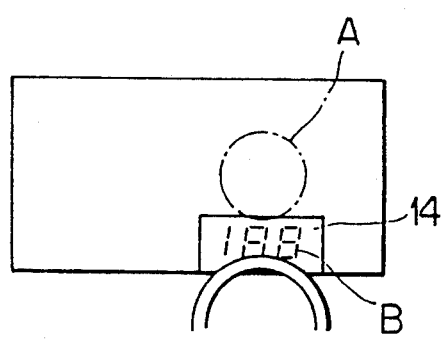
FIGS. 10a-b examples of the displayed images in the second embodiment.

Therefore, as shown in FIG. 10a, the displayed image B is sighted outside but near the visible range A of the driver when the vehicle is moving at high speed, whereby the driver can catch sight of the displayed image B with ease without being disturbed by the existence of the reflecting means.

On the other hand, when the vehicle is running at low speed, the reflecting means is moved to be located at the point Q(FIG. 12) which is deviated from right front of the driver 16, and the angle of the surface thereof is rotatably shifted for β degree toward the shifted direction thereof, so that the displayed image projected from the projector 11 is reflected samely to the driver's eyes.

Figure 10B:
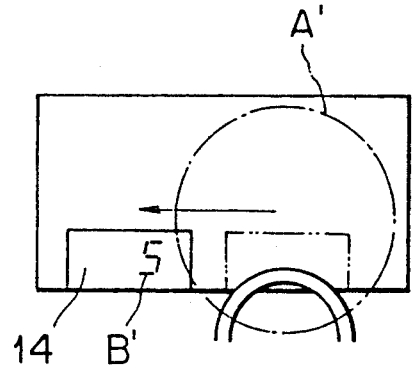

Therefore, as shown in FIG. 10b the reflecting means 14 and the displayed image B' are shifted away from the visible range A' of the driver when the speed is low so that the driver is not disturbed by the reflecting means.

By the way, as shown above, the locating points P, Q of the reflecting means 14, and furthermore the rotating angles and for each of the two points P, Q are predetermined, such that the location shifting motor 86 and the angle controlling motor 82 are activated to adapt these predetermined figures.

THE THIRD EMBODIMENT

Figure 13:
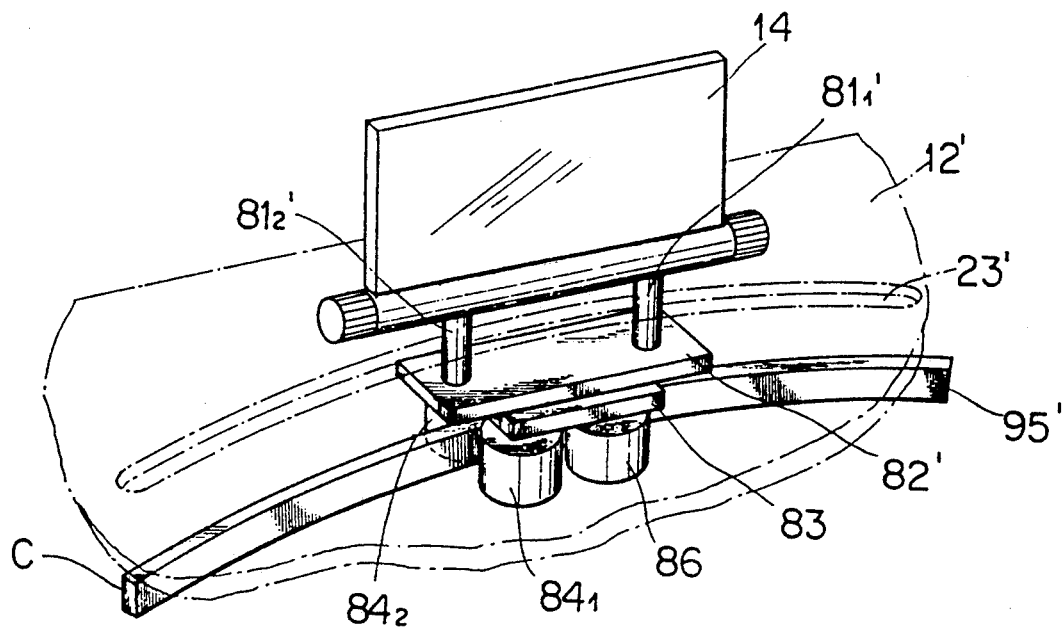
FIG. 13 shows the reflecting means shifting means in the third embodiment based on the second embodiment.
Figure 14:
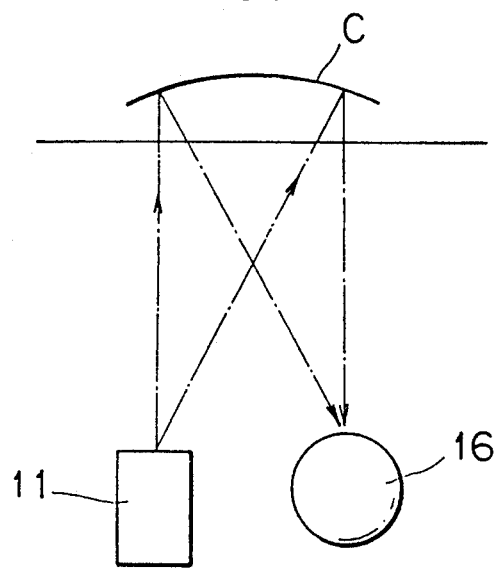
FIG. 14 is a schematic view showing the shape of an elongate slit and a guide rail of a reflecting means shifting means shown in FIG. 13.
Figure 15A:
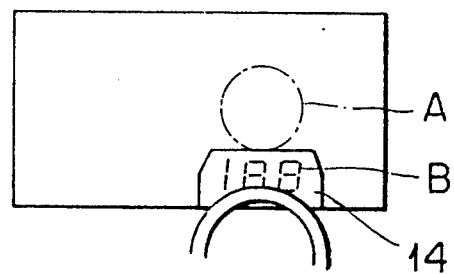
FIGS. 15a-b an exapmle of the displayed image in the conventional display unit.
Figure 15B:
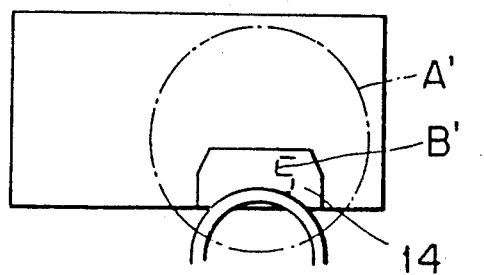

FIG. 13 shows the third embodiment according to the present invention using a reflecting means shifting means. In the figure, the fixing board 83, a pair of rollers 841 and 842, and the location shifting motor 86 are same as those shown in FIG. 11.

This reflecting means shifting means uses supporting members 811' and 812', and a rotating board 82' for supporting them instead of the above supporting member 81 and the controlling motor 82 adopted in the second embodiment, and elongate slit 23' on the dashboard 12' and a guide rail 85' are configured in an arcuated form along the curve line C so that the image projected from the projector 11 is reflected to the eye level of the driver 16.

The above rotating board 82' is rotatably fixed to the fixing plate 83, and a pair of supporting members 811' and 812' are inserted into the above elongate slit 23' which is running in approximate parallel with the windshield 10.

Consequently, when the location shifting motor 86 is activated, the supporting members 811' and 812' are slid along the edge of the elongate slit 23', whereby the surface of the reflecting means 14 always faces to the driver in the optimum angle, so that the reflecting means can be shifted according to the speed of the vehicle in the same mode as that of the aforementioned second embodiment.

In the above third embodiment, the image displayed by the display device 20 is to be directly reflected by the reflecting means, but when a lens is used in the projector 11 for the purpose of displaying the image in the distance, the projector 11 can be constructed so as to rotate according to the shifting movement of the reflecting means 14.

While the invention has been particularly shown and described in reference to preferred embodiments thereof, it will be understood by those skilled in the art that changes in form and details may be made therein without departing from the spirit and scope of the invention.

What is claimed is:

1. An indication display unit for vehicles enabling a driver to sight an indicating image comprising:
   an image projector device including a display device for projecting an indicating image;

a reflecting means located forwardly of a driver seat for reflecting said indicating image; and a location shifting means having a mechanism for completely shifting said reflecting means in one of a vertical motion and a transversal motion in accordance with a vehicle velocity, wherein said reflecting means includes a first portion and a second portion, said first portion being located above a dashboard level and a second portion being located below the dashboard level when said reflecting means is in use.

2. An indication display unit for vehicles as claimed in claim 1, wherein said reflecting means can be stored inside a dashboard.

3. An indication display unit for vehicles as claimed in claim 2, wherein said reflecting means has a rotatable lid disposed along the longer side edge of an opening arranged on said dashboard activated to be shut by said mechanism when said reflecting means is stored inside said dashboard.

4. An indication display unit for vehicles as claimed in claim 1, wherein said reflecting means can be shifted along an elongate slit running on said dashboard.

5. An indication display unit for vehicles as claimed in claim 4, wherein a reflecting angle $\alpha$ at the position P of said reflecting means is automatically changed to a reflecting angle $\beta$ when the position of said reflecting means is shifted to another position Q by a shifting motor and an angle controlling motor contained in said shifting mechanism according to a predetermined value.

6. An indication display unit for vehicles as claimed in claim 1, wherein said reflecting means can be shifted along a curve slit running in approximate parallel with the windshield.

7. An indication display unit for vehicles as claimed in claim 5, wherein said location shifting means mechanism contains an elongate rail below said elongate slit.

8. An indication display unit for vehicles as claimed in claim 6, wherein said location shifting means mechanism contains an arcuated rail below said elongate slit.

9. An indication display unit for vehicles enabling a driver to sight an indication image comprising:
an image projector device including a display device for projecting an indicating image;
a reflecting means located forwardly of a driver seat for reflecting said indicating image; and
a location shifting means having a mechanism for completely shifting said reflecting means in one of a vertical motion and a transversal motion in accordance with a vehicle velocity, wherein said reflecting means, when shifted, still functions by reflecting said indicating image from said image projector, wherein said reflecting means includes a first portion and a second portion, said first portion being located above a dashboard level and a second portion being located below the dashboard level when said reflecting means is in use.

* * * * *